(12) United States Patent
Oda

(10) Patent No.: US 6,710,344 B2
(45) Date of Patent: Mar. 23, 2004

(54) THERMAL INFRARED DETECTOR

(75) Inventor: Naoki Oda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/301,418

(22) Filed: Nov. 21, 2002

(65) Prior Publication Data

US 2003/0168598 A1 Sep. 11, 2003

Related U.S. Application Data

(62) Division of application No. 09/712,051, filed on Nov. 14, 2000, now Pat. No. 6,528,789.

(30) Foreign Application Priority Data

Nov. 30, 1999 (JP) .............................. 11-340323

(51) Int. Cl.⁷ ................................................. G01J 5/00
(52) U.S. Cl. ..................................................... 250/338.1
(58) Field of Search ....................... 250/338.1

(56) References Cited

U.S. PATENT DOCUMENTS 6,194,722 B1 * 2/2001 Fiorini et al. ............ 250/338.1

* cited by examiner

Primary Examiner—Constantine Hannaher
Assistant Examiner—Shun Lee
(74) Attorney, Agent, or Firm—Choate, Hall & Stewart

(57) ABSTRACT

A thermal infrared detector has a substrate having a readout circuit and a plurality of pixels patterned on the substrate at a pitch p, which is in the range of from 15 to 50 micrometers. Each of the pixels has a photo-sensitive bolometer thin film area that is spaced from the substrate, and supported by two beams which contain interconnections between the photo-sensitive area and the readout circuit. The length of each of the beams is determined by the patterning accuracy of a stepper used to produce the thermal infrared detector, based on a beam length index calculated by dividing the length of each beam by one-quarter of the peripheral length of the pixel. The beam length index may be approximated by an expression using the pixel pitch, the thermal conductivity of the interconnection material, etc. as parameters in an equation representing temperature resolution.

12 Claims, 12 Drawing Sheets

THERMAL INFRARED DETECTOR

CROSS REFERENCE TO RELATED APPLICATIONS

This application is a divisional of U.S. patent application Ser. No. 09/712,051 filed Nov. 14, 2000, now U.S. Pat. No. 6,528,789.

BACKGROUND OF THE INVENTION

1. Field of the Invention

The present invention relates to a thermal infrared detector having a thermal isolation structure for minimum temperature resolution.

2. Description of the Related Art

Thermal infrared detectors are available in different types including a bolometer type, a pyroelectric type, and a thermocouple type. These thermal infrared detectors have a thermal isolation structure, i.e., a so-called diaphragm structure, for increased detection sensitivity. In the thermal isolation structure, a diaphragm has an outer edge supported in spaced relation to a substrate by a plurality of beams.

Several thermal isolation structures of conventional thermal infrared detectors will be described below with reference to accompanying drawings.

FIG. 1 of the accompanying drawings schematically shows in plan a pixel of a 320×240 pixel thermistor bolometer-type infrared detector developed by Santa Barbara Research Center (see W. Radford et al., SPIE, Vol. 2746, 1996, page 82). The pixels of the illustrated infrared detector are spaced at a pitch of 48 μm. Each of the pixels comprises a substrate 101 on which a readout circuit is formed, and a diaphragm (photo-sensitive area) 102 supported on and spaced from the substrate 101 by two beams 103. The entire chip of the infrared detector, which includes a matrix of those pixels, is encased in an evacuated package. The diaphragm 102 comprises a thin film of thermistor bolometer material and a protective film surrounding the thin film of thermistor bolometer material. Each of the beams 103 comprises an interconnection which electrically connects the readout circuit to the thin film of thermistor bolometer material via a contact 105, and a protective film surrounding the interconnection.

When an infrared radiation is applied to the diaphragm 102, the applied infrared radiation is absorbed by the diaphragm 102, producing heat which increases the temperature of the diaphragm 102. The rise in the temperature of the diaphragm 102 changes the resistance of the thin film of thermistor bolometer material, and the changed resistance is converted by the readout circuit in the chip into an electric signal, which is converted into an image representative of the detected infrared radiation.

In order to increase the sensitivity of the infrared detector, it is important that the heat absorbed by the diaphragm 102 and transferred to the substrate 101 be minimized, i.e., the thermal conductance of the diaphragm 102 be reduced. In many thermal infrared detectors, the chip is encased in the evacuated package and the beams 103 be thinned to reduce the thermal conductance of the diaphragm 102.

FIG. 2 of the accompanying drawings schematically shows in plan a pixel of a 320×240 pixel thermistor bolometer-type infrared detector developed by Loral Infrared & Imaging Systems (see C. Marshall et al., SPIE, Vol. 2746, 1996, page 23). The pixels of the illustrated infrared detector are spaced at a pitch of 46.25 μm. Each of the pixels comprises a substrate 111, and a diaphragm 112 supported on and spaced from the substrate 111 by two beams 113, and contacts 115. The infrared detector shown in FIG. 2 detects an infrared radiation according to the same principle as the infrared detector shown in FIG. 1. The infrared detector shown in FIG. 2 differs from the infrared detector shown in FIG. 1 in that the beams 113 are bent around an outer peripheral edge of the diaphragm 112 and the beams 113 are longer than the beams 103 shown in FIG. 1. The diaphragm 112 thus constructed has a small thermal conductance for increased detection sensitivity.

FIGS. 3a through 3e of the accompanying drawings schematically show in plan a pixel of a thermistor bolometer-type infrared detector developed by National Optics Institute (see H. Jerominek et al., SPIE, Vol. 2746, 1996, page 60). The infrared detector shown in FIGS. 3a through 3e has a diaphragm 122 supported on a substrate 121 by beams 123, and detects an infrared radiation according to the same principle as the infrared detector shown in FIG. 1. FIGS. 3a through 3e show various different thermal isolation structures. Specifically, the thermal isolation structures shown in FIGS. 3a, 3b differ from each other with respect to the number of bends of beams 123. The thermal isolation structure shown in FIG. 3b has a better thermal isolation capability than the thermal isolation structure shown in FIG. 3a, but has a smaller filling factor of the diaphragm 122, i.e., a smaller occupation ratio of the diaphragm 122 with respect to the pixel. The thermal isolation structure shown in FIG. 3c is designed to increase the thermal isolation capability by changing the manner in which the beams 123 are bent. Each of the thermal isolation structures shown in FIGS. 3d, 3e has four beams 123 to support the diaphragm 122.

FIG. 4a of the accompanying drawings schematically show in plan a pixel of a 16×16 pyroelectric infrared detector developed by Toyota Central R&D Labs., Inc., and FIG. 4b is a cross-sectional view taken along line 4b—4b of FIG. 4b (see Fujitsuka et al., Journal of Japan Society of Infrared Science and Technology).

In FIGS. 4a and 4b, the pixel has sides each 75 μm long, and includes a cavity 205 defined in an n-type silicon substrate 200 by the bulk micro-machining technology. A diaphragm 201 is supported over the cavity 205 by four beams 202 each having a width of 4 μm and a length of 59 μm. The diaphragm 201 comprises a silicon oxide film 203 and an electrode 204 of Ti/TiN. One of the four beams 202 has an interconnection 204' of Ti/TiN that is electrically connected to the electrode 204. Although not shown, a thin film of PVDF (Polyvinylidene Fluoride) as a pyroelectric material is deposited on the electrode 204 of the diaphragm 201, and a metal film serving as an infrared absorption film and also as an upper electrode is deposited on the thin film of PVDF.

An infrared radiation applied to the diaphragm 201 is absorbed by the diaphragm 201, producing heat that changes the polarized state of the pyroelectric material and generates a surface charge on the diaphragm 201. The surface charge is converted by a readout circuit (not shown) on the n-type silicon substrate 200 into an electric signal, which is converted into an image representative of the detected infrared radiation.

While various thermal isolation structures have heretofore been attempted, they have not been optimized to minimize the temperature resolution. Specifically, the temperature resolution can generally be reduced by increasing the length of the beams to provide a better thermal isolation between the diaphragm and the substrate. However, if the pixels are large, then excessively increasing the thermal isolation results in a worse temperature resolution because it increases a thermal time constant that prevents the diaphragm from keeping up with a change in the temperature of the subject being detected.

SUMMARY OF THE INVENTION

It is therefore an object of the present invention to provide a thermal infrared detector having beams whose lengths are optimum for minimizing the temperature resolution depending on the size of pixels.

To achieve the above object, a thermal infrared detector according to the present invention has a substrate having a readout circuit and a plurality of pixels patterned on the substrate at a pitch p in the range of $15 \leq p \leq 50$ ($\mu$m). Each of the pixels has a diaphragm including a thin film of bolometer and spaced from the substrate, two beams by which the diaphragm is supported on the substrate, and interconnections formed respectively on the beams and connecting the readout circuit and the thin film of bolometer to each other. The length of each of the beams is determined by a beam length index which is produced by dividing the length of each of the beams by one-quarter of the peripheral length of the pixel. The beam length index is given by an approximate expression using the pixel pitch as a parameter, determined depending on the type of a stepper used to pattern the pixels and the thermal conductivity of the material of the interconnections based on an equation representing temperature resolution (the equation (1) described later on). In view of the patterning accuracy of the stepper, the beam length index is given in the range of ±15% of the above approximate expression.

By thus determining the length of the beams according to the beam length index that is determined using the pixel pitch as a parameter, the thermal infrared detector has a beam length optimum, given depending on the pixel pitch, for minimizing the temperature resolution.

The thermal conductivities k of interconnection materials of the beams are classified into a first group where $0.065 \leq k \leq 0.09$ (W/(cm.K)), a second group where $0.10 \leq k \leq 0.15$ (W/(cm.K)), and a third group where $0.16 \leq k \leq 0.22$ (W/(cm.K)). The interconnection materials of the first group include alloys mainly composed of Ti and containing at least Al, the interconnection materials of the second group include Ni—Cr alloys, and the interconnection materials of the third group include Ti or alloys mainly composed of Ti and containing no Al.

The above and other objects, features, and advantages of the present invention will become apparent from the following description with reference to the accompanying drawings which illustrate examples of the present invention.

BRIEF DESCRIPTION OF THE DRAWINGS

FIG. 4b is a cross-sectional view taken along line 4b—4b of FIG. 4a;

DESCRIPTION OF THE PREFERRED EMBODIMENTS

Figure 1:
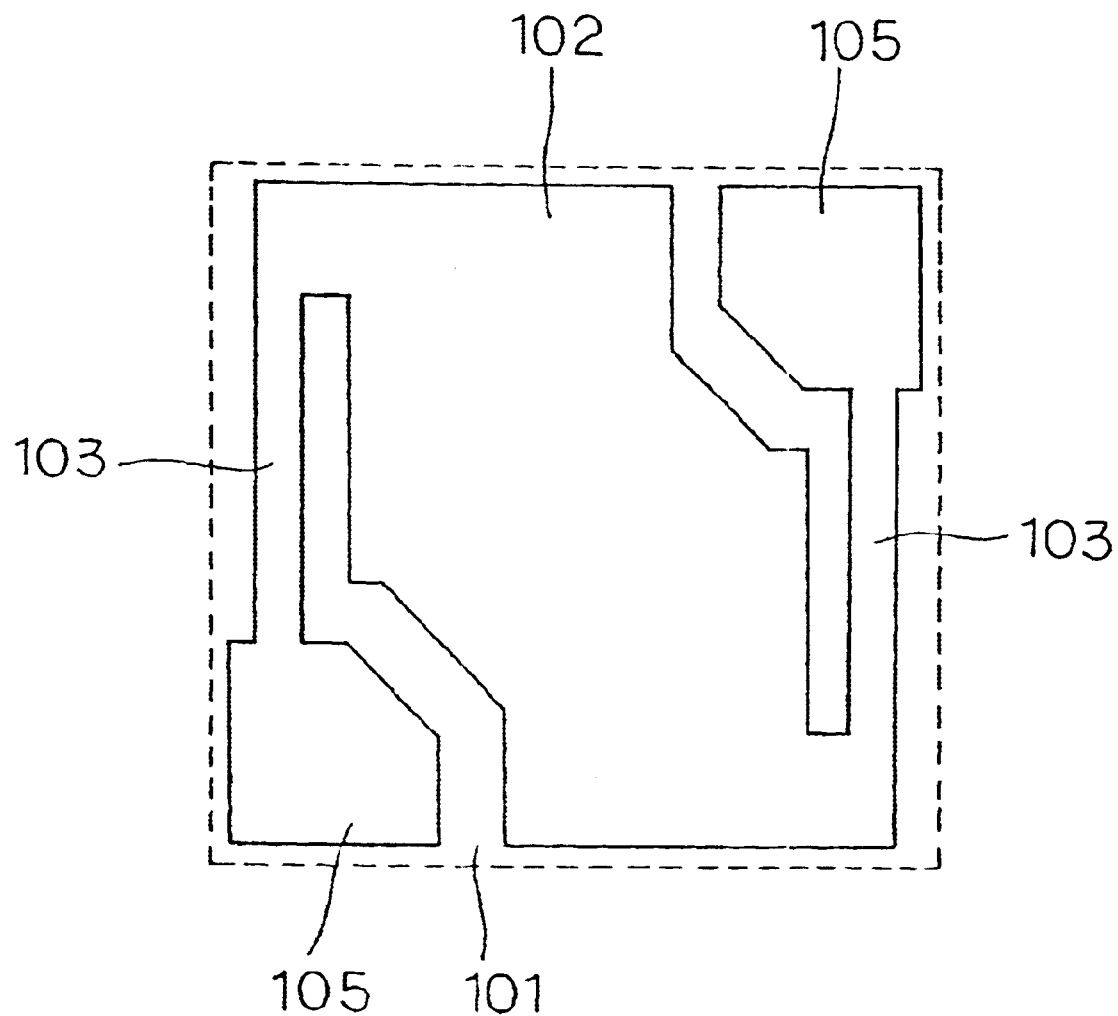
FIG. 1 is a schematic plan view of a pixel of a conventional thermistor bolometer-type infrared detector.
Figure 2:
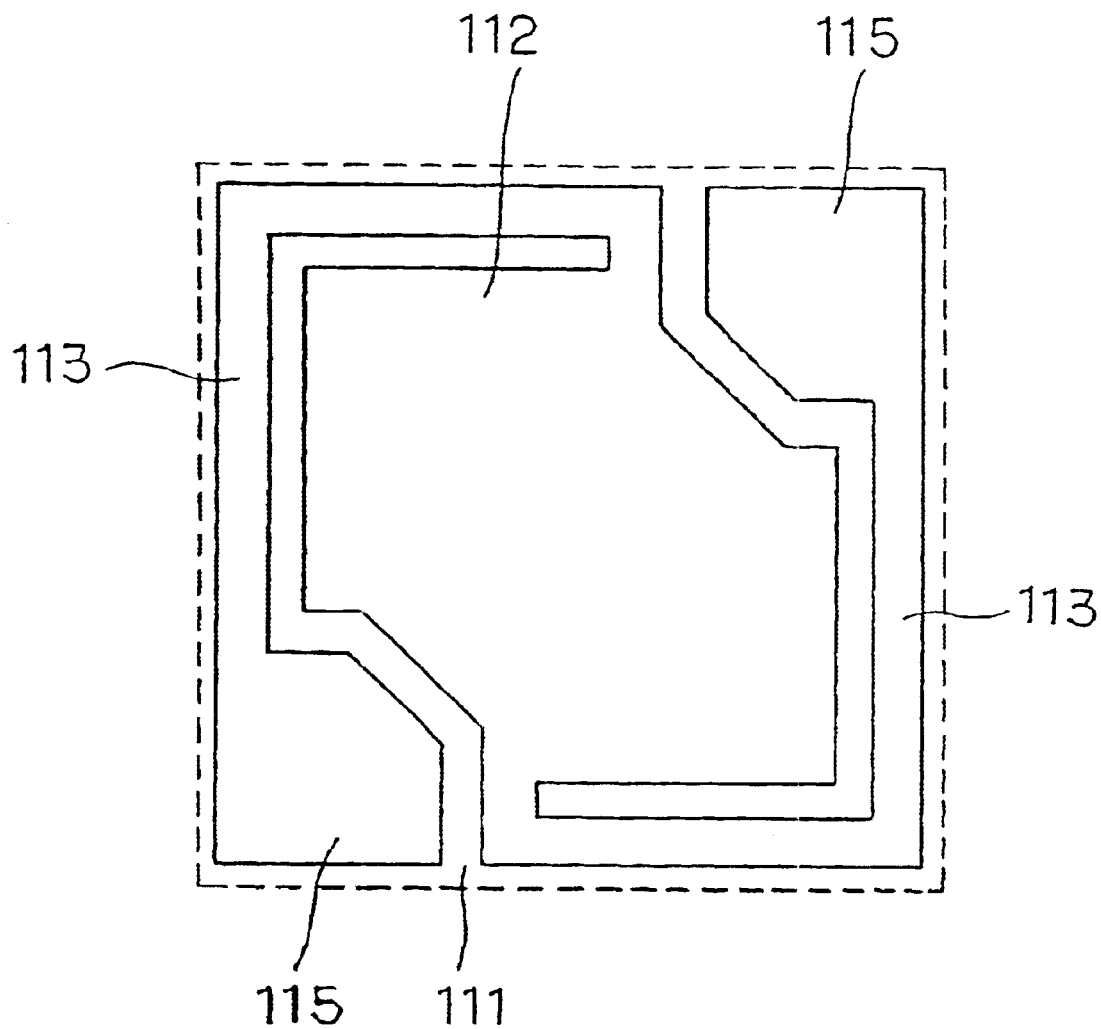
FIG. 2 is a schematic plan view of a pixel of another conventional thermistor bolometer-type infrared detector.
Figure 3A:
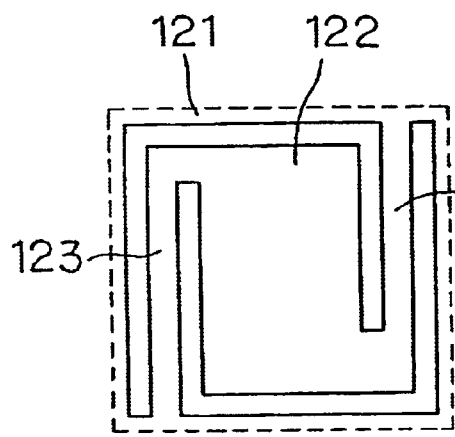
FIGS. 3a through 3e are schematic plan views of pixels of other conventional thermistor bolometer-type infrared detectors.
Figure 3B:
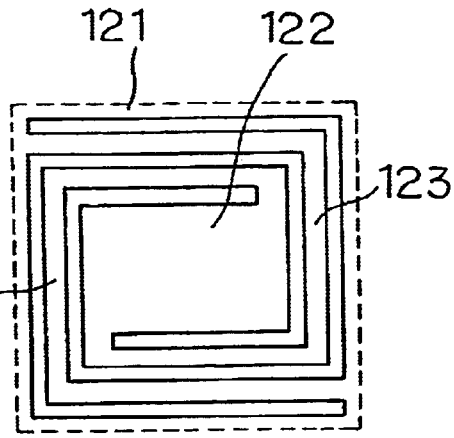
Figure 3C:
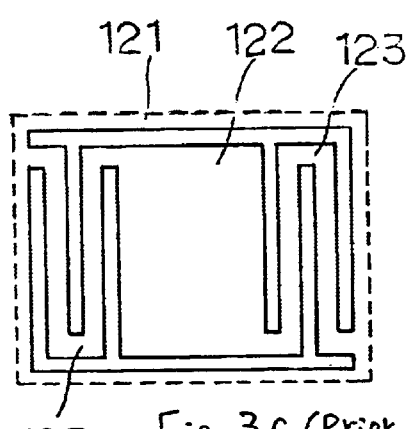
Figure 3D:
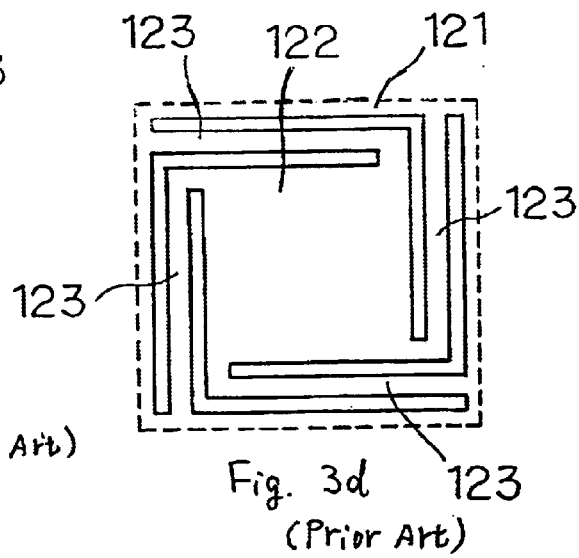
Figure 3E:
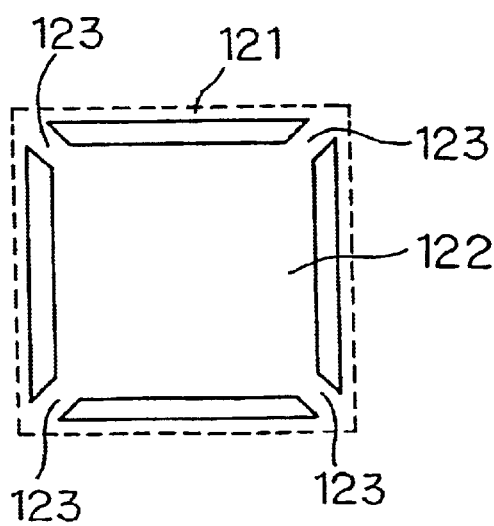
Figure 4A:
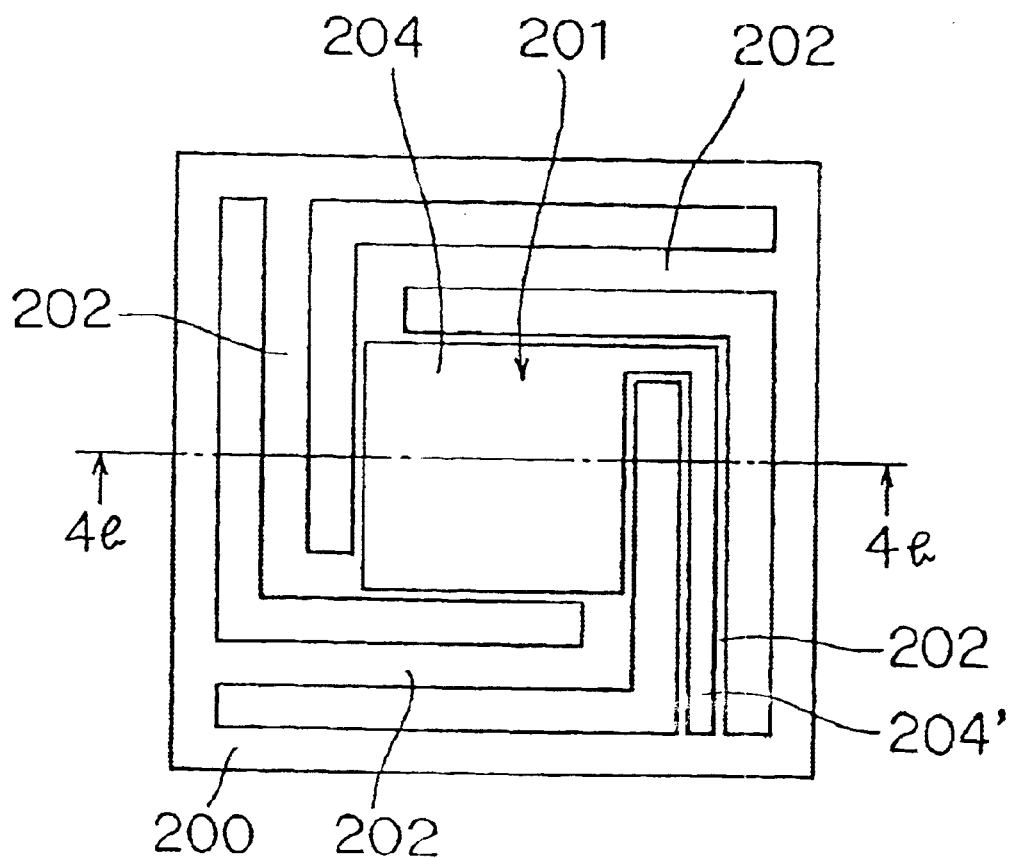
FIG. 4a is a plan view of a thermal insulation structure of a conventional pyroelectric infrared detector.
Figure 4E:
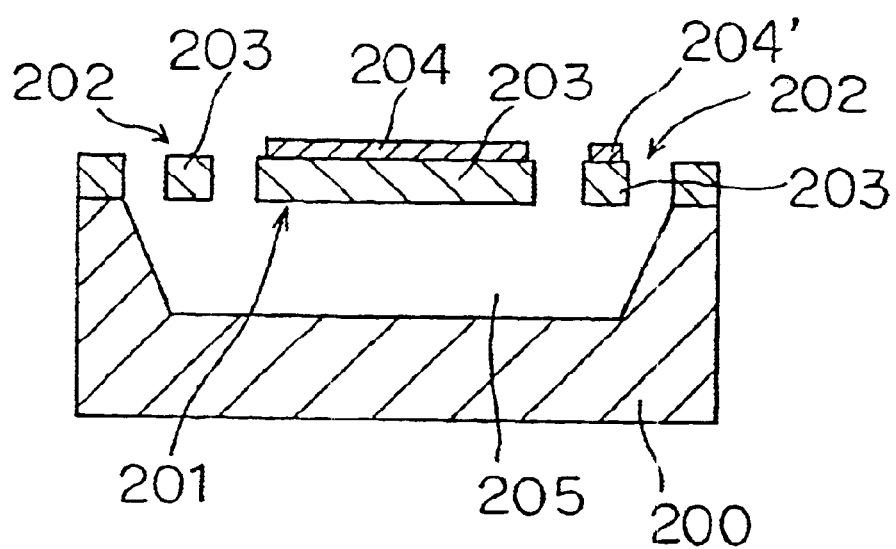
Figure 5:
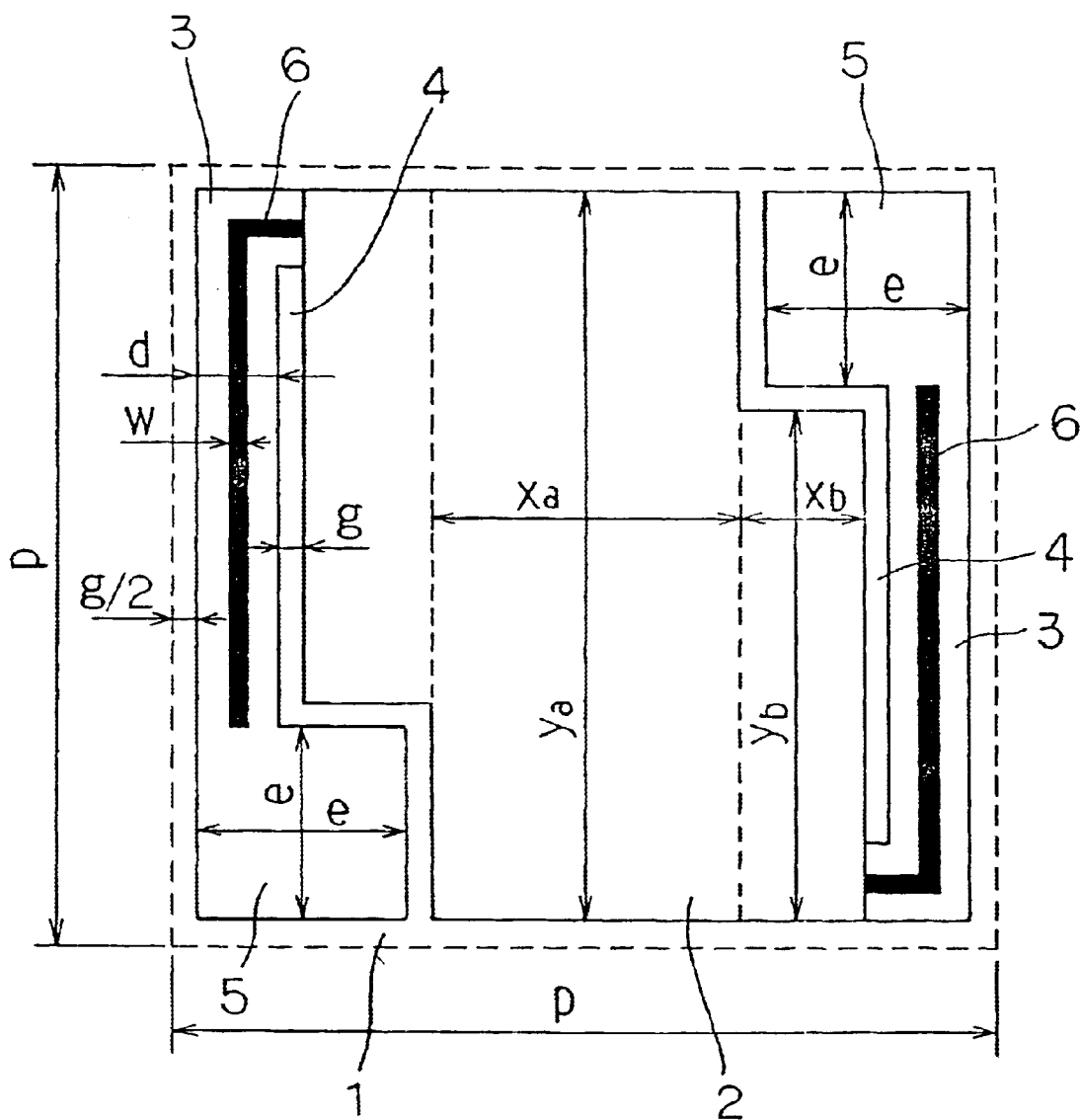
FIG. 5 is a schematic plan view of a pixel of a thermal infrared detector according to an embodiment of the present invention.

Referring to FIG. 5, there is shown a pixel of a thermal infrared detector according to an embodiment of the present invention which comprises a substrate 1 of Si, two contacts 5 formed on the substrate 1, and a diaphragm 2 supported on and spaced from the substrate 1 by beams 3 extending from the contacts 5. The contacts 5, the beams 3, and the diaphragm 2 jointly make up one pixel. The thermal infrared detector comprises a matrix of pixels arranged in horizontal rows and vertical columns and spaced at a pitch p.

The diaphragm 2 functions as a photo-sensitive area, and has a laminated structure comprising a protective film, a thin film of thermistor bolometer material, and a protective film. An interconnection 6 in the form of a thin film extends on and along each of the beams 3 and electrically connects the thin film of thermistor bolometer material of the diaphragm 2 to a readout circuit in the substrate 1 via the contact 5. Each of the beams 3 including the interconnection 6 serves as a supporting structure which also has a laminated structure comprising upper and lower protective films as with the diaphragm 2. The diaphragm 2 includes contacts (not shown) by which the thin film of thermistor bolometer material thereof is electrically connected to the interconnections 6.

The contacts 5 are positioned diagonally across the pixel. The beams 3 extend from the respective contacts 5 along outer edges of the diaphragm 2, and are bent at a right angle and joined to the diaphragm 2 on confronting sides of the diaphragm 2 at positions that are in point symmetry with respect to the center of the diaphragm 2. The shape of the diaphragm 2 is determined by the shapes and sizes of the contacts 5 and the beams 3. Between parallel portions of the diaphragm 2 and the beams 3, there are provided slits 4 for etching a sacrificial layer that is formed between the substrate 1 and the diaphragm 2 in the process of fabrication of the thermal infrared detector.

When an infrared radiation is applied to the diaphragm 2, the applied infrared radiation is absorbed by the diaphragm 2, producing heat which increases the temperature of the diaphragm 2. The rise in the temperature of the diaphragm 2 changes the resistance of the thin film of thermistor bolometer material, and the changed resistance is converted by the readout circuit in the substrate into an electric signal, which is converted into an image representative of the detected infrared radiation.

The basis for increasing the sensitivity of the thermal infrared detector is the development of a thin film of thermistor bolometer material which has a large temperature coefficient of resistance (TCR) and the development of a thermal insulation structure which prevents the heat absorbed by the diaphragm 2 from being transferred away. The present invention is concerned with the thermal insulation structure in particular.

The amount of heat absorbed by the diaphragm 2 is determined by a filling factor $F_F$ of the pixel, and the thermal isolation characteristic thereof by the thermal conductance of the beams 3, i.e., the material and length of the beams 3.

Temperature resolution (NETD), which is one of performance indicators of an infrared camera, is expressed by the following equation (1):

$$NETD = \frac{V_N}{p^2 F_F \Omega \int \frac{dB(\lambda,T)}{dT} T_r(\lambda) d\lambda \frac{\alpha \eta V_B \varphi}{G_{th}}} [K] \quad (1)$$

where $$\varphi = 1 - \exp\left(-\frac{\tau_f}{\tau_{th}}\right)$$

$\alpha$ represents the effective value of the temperature coefficient of resistance (TCR), and is represented by:

$$\alpha = \alpha_0 \frac{[\text{bolometer resistance } R_B]}{[\text{bolometer resistance } R_B] + [\text{beam resistance } R_n]} \quad (2)$$

where $\alpha_0$ represents the temperature coefficient of resistance of the material itself.

In the equation (1), $V_N$ represents the noise voltage, p the pixel pitch, $F_F$ the filling factor, $\Omega$ the solid angle of the optical system, B ($\lambda$, T) the formula of the black body radiation, T the temperature of the object, $T_r$ ($\lambda$) the transmittance of the optical system, $\eta$ the infrared radiation absorption ratio of the pixel, $V_B$ the bias voltage applied to the bolometer, $G_{th}$ the thermal conductance, $\tau_{th}$ the thermal time constant, and $\tau_f$ the time constant (33 msec.) corresponding to the television frame rate.

The noise voltage $V_N$ is determined by background radiation noise $V_{PN}$, temperature fluctuation noise $V_{TF}$, Johnson noise $V_{JN}$, 1/f noise $V_f$, and circuit noise $V_a$, which are expressed by the following equations (3) through (7) (see B. R. Johnson & P. W. Kruse, SPIE, 2020 (1993) 2: K. C. Liddiard, U. Ringh, & C. Jansson, SPIE, 2552 (1995) 564: P. H. Handel, Phys. Rev. A, 22 (1980) 745):

$$V_N = \sqrt{V_{PN}^2 + V_{TF}^2 + V_{JN}^2 + V_f^2 + V_a^2} \quad (3)$$

$$V_{PN} = R_V \sqrt{\frac{A\sigma k(T_{OP}^5 + T_{BKG}^5)}{2\eta \tau_{th}}} [V] \quad (4)$$

$$V_{TF} = \frac{R_V}{\eta} \sqrt{4kT_{OP}^2 G_{th} \Delta f_{TF}} [V] \quad (5)$$

$$V_{JN} = \sqrt{4kT_{OP} R_B \Delta f_{JN}} [V] \quad (6)$$

$$V_f = \sqrt{\int_{f_1}^{f_2} \frac{KV_B^2}{f} df} = V_B \sqrt{K l_n\left(\frac{1}{2\tau_{ro} f_1}\right)} [V] \quad (7)$$

where $l_n$ is the natural logarithm.

In the equation (3), the circuit noise $V_a$ is assumed to be 1.67 times the Johnson noise of the bolometer resistance.

In the equations (4) through (7), $R_V$ represents the responsivity, A the photo-sensitive area, $\sigma$ the Stefan-Boltzmann constant, k the Boltzmann constant, $T_{op}$ the operating temperture, $T_{BKG}$ the background temperture, $R_B$ the bolometer resistance, $\Delta f_{TF}$ the band width of temperature fluctuation noise, $\Delta f_{JN}$ the band width of Johnson noise, $\tau_{ro}$ the readout time, $\beta$ a constant, and K the 1/f noise index.

The above values $R_V$, A, $\Delta f_{TF}$, $\Delta f_{JN}$, $f_2$, $\tau_{th}$ and K are expressed respectively by the following equations (8) through (14):

| | | |
|---|---|---|
| $R_V = \alpha \eta V_B \varphi / G_{th}$ | [V/W] | (8) |
| $A = p^2 F_F$ | | (9) |
| $\Delta f_{TF} = 1/4\tau_{th}$ | | (10) |
| $\Delta f_{JN} = 1/2\tau_{ro}$ | | (11) |
| $f_2 = f_1 + \Delta f_{JN} \sim \Delta f_{JN}$. | | (12) |
| $\tau_{th} = C_{th}/G_{th}$ | | (13) |
| $K = \beta(\mu/\mu_{latt})^2/N$ | | (14) |

In the equation (14), N represents the total number of free carriers in the thin film of thermistor bolometer material, $\mu$ the mobility, and $\mu_{latt}$ the mobility determined by lattice vibrations.

The filling factor $F_F$ which determines the amount of heat absorbed by the diaphragm 2 and the length of the beams 3 which determines the thermal conductance of the diaphragm 2 can be calculated using, as parameters, the slit width g, the beam width d, and the size of the contacts 5 (each of the contacts 5 is of a square shape whose sizes each has a length e) shown in FIG. 5.

The slit width g, i.e., the distance between the diaphragm 2 and the beams 3 is determined by the patterning accuracy in exposure and development processes. The beam width d is determined by the width of the interconnections 6 on the beams 3 and the positioning accuracy of the exposure device (stepper).

Table 1, given below, shows typical values of the patterning accuracy and the positioning accuracy of a g-line stepper and an i-line stepper.

TABLE 1

|  | g-line stepper | i-line stepper |
|---|---|---|
| Patterning accuracy ($\mu$m) | 0.8 | 0.5 |
| Positioning accuracy ($\mu$m) | 0.25 | 0.11 |

Generally, if the g-line stepper is used, then the slit width g is g=0.8 $\mu$m and the beam width d is d=2.6 $\mu$m, and if the i-line stepper is used, then the slit width g is g=0.5 $\mu$m and the beam width d is d=2 $\mu$m.

As shown in FIG. 5, if the diaphragm 2 is divided into three elongate rectangles, the area of the diaphragm 2 can be calculated using horizontal and vertical lengths $x_a$, $y_a$, $x_b$, $y_b$ of those rectangles. A value n is obtained by dividing the length $l_{th}$ of the beams 3 by one-quarter of the peripheral length of the pixel. Since the peripheral length of the pixel is 4 p in this embodiment, the value n is expressed by n=$l_{th}$/p. Because each of the pixels of thermal infrared detectors is generally of a square shape, the value n represents how many times the length of one side of the pixel the length $l_{th}$ of the beams 3 is. The value n will hereafter be referred to as "beam length index n".

In FIG. 5, each of the beams 3 extends along one side of the diaphragm 2, and is bent once and joined to the diaphragm 2 at an end of the side. Using p, d, e, g, the lengths $x_a$, $y_a$, $x_b$, $y_b$ and the value n are expressed as follows:

$x_a = p - 2e - 3g$ $y_a = p - g$ $x_b = e - d$ $y_b = p - e - 2g$ $n = (p - e)/p$

Figure 6:
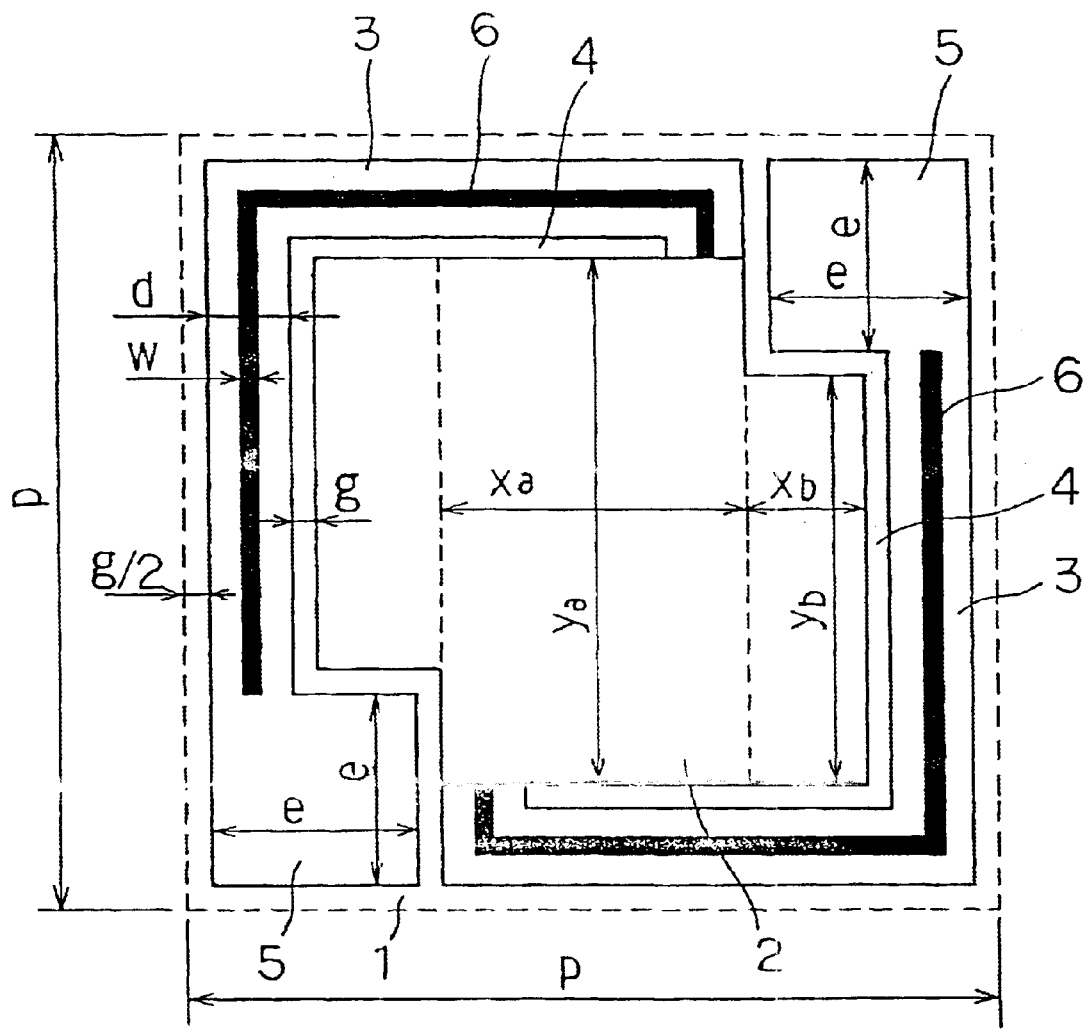
FIG. 6 is a schematic plan view of a pixel of a thermal infrared detector according to another embodiment of the present invention.
Figure 7:
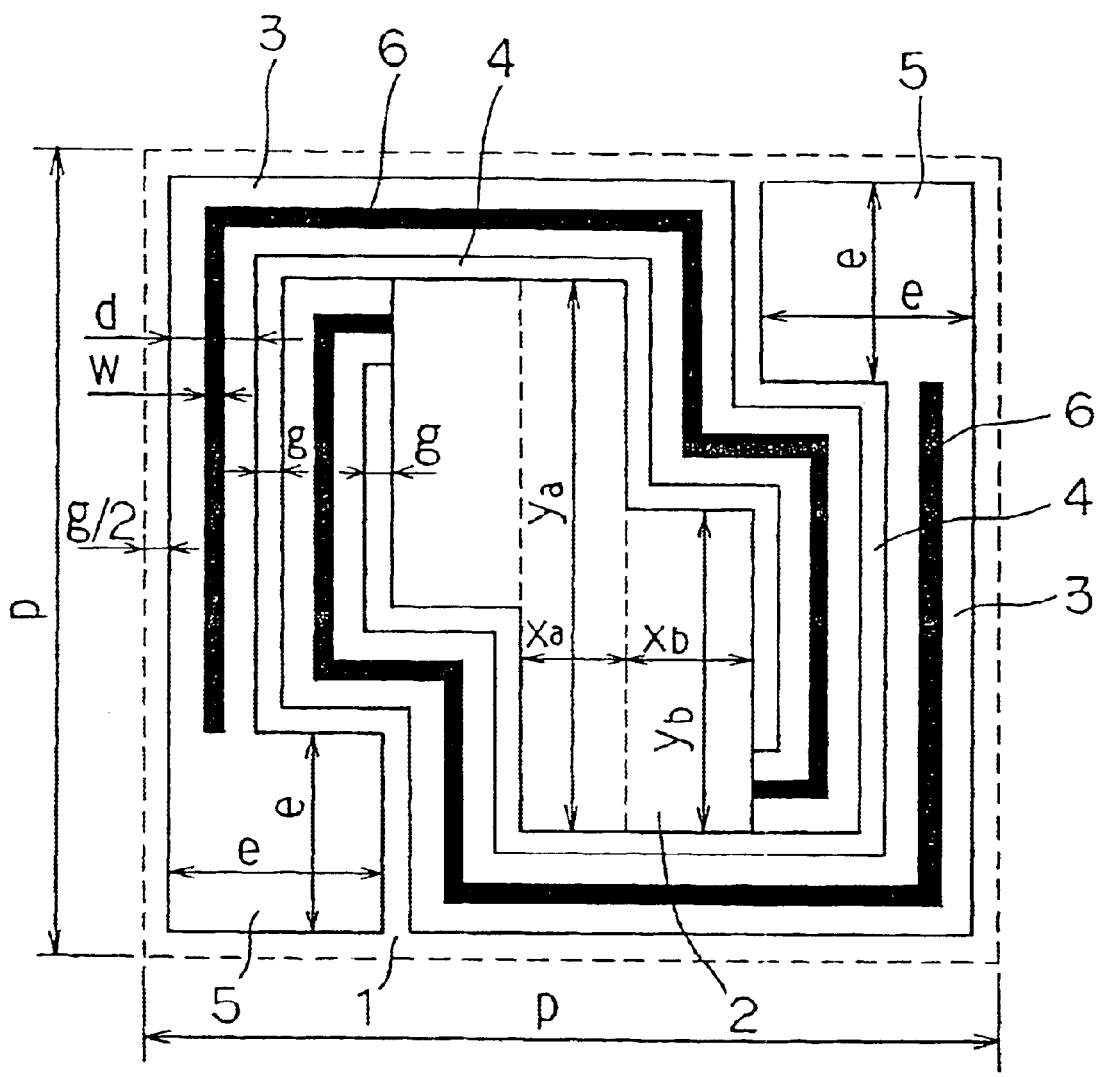
FIG. 7 is a schematic plan view of a pixel of a thermal infrared detector according to still another embodiment of the present invention.

If the length of the beams 3 is made longer than the length shown in FIG. 5, then each of the beams 3 extends further from the bent position shown in FIG. 5, and is bent twice and joined to the diaphragm 2, as shown in FIG. 6. If the length of the beams 3 is made further longer than the length shown in FIG. 6, then each the beams 3 enters between the diaphragm 2 and the other beam 3, and is joined to the diaphragm 2, as shown in FIG. 7.

Using the lengths $x_a$, $y_a$, $x_b$, $y_b$, the area of the diaphragm 2 is expressed by:

$x_a y_a + 2 x_b y_b$

Therefore, the filling factor $F_F$ is expressed by:

$$F_F = (x_a y_a + 2 x_b y_b)/p^2 \quad (15)$$

If a thermal conductance determined by a thermal radiation is represented by $G_{th,rad}$, then since the thermal radiation of the diaphragm 2 involves two surfaces, i.e., face and back sides, of the diaphragm 2, the thermal conductance $G_{th,rad}$ is expressed by:

$$G_{th,rad} = 8\sigma T_{op}^3 p^2 F_F \quad (16)$$

where $T_{op}$ is the operating temperature.

Therefore, a total thermal conductance $G_{th,total}$ is expressed by the following equation (17):

$$G_{th,total} = G_{th,cond} + G_{th,rad} \quad (17)$$

The thermal conductance $G_{th,cond}$ which is determined by the thermal conduction of the beams 3 is calculated from the length $l_{th}$ of the beams 3, the number (2) of the beams 3, the width and thickness (represented respectively by $d_M$, $t_M$) of the interconnections 6, the width and thickness (represented respectively by $d_P$, $t_P$) of the protective films of the beams 3, and the thermal conductivities ($k_M$, $k_P$) of the interconnection material and the protective film material of the beams 3, according to the following equation (18):

$$G_{th\ cond} = \frac{2}{l_{th}}(k_M d_M t_M + k_P d_P t_P) \quad [W/K] \quad (18)$$

The thermal capacity $C_{th}$ of the diaphragm 2 is calculated from the area, thickness $t_B$, and isovolumic specific heat $C_{V,B}$ of the thin film of thermistor bolometer material, which is a component of the diaphragm 2, and the area, thickness $t_P$, and isovolumic specific heat $C_{V,P}$ of the protective film, according to the equation (19) given below. To simplify the calculation, the areas of the thin film of thermistor bolometer material and the protective film are represented by $p^2 F_F$.

$$C_{th} = p^2 F_F (C_{V,B} t_B + C_{V,P} t_P) \quad [J/K] \quad (19)$$

The thermal time constant $\tau_{th}$ of the thermal isolation structure is represented by $\tau_{th} = C_{th}/G_{th,total}$. If the thermal time constant $\tau_{th}$ has a large value, then an after image poses a problem on a real-time infrared thermal image.

If the resistance of the beams 3 is represented by R in the equation (2), then the resistance R is expressed from the specific resistance $\rho$ of the interconnection material of the beams 3, the width w of the interconnections, the thickness t of the interconnections, and the length $l_{th}$ of each of the beams 3, according to the following equation (20):

$$R = \rho 2 \frac{l_{th}}{wt} \quad (20)$$

The specific resistance $\rho$ ($\Omega$cm) of the interconnection material and the thermal conductivity k (w/cm.K) thereof are related to each other by the equation: k=6.735$\rho^{-0.8957}$.

Specific calculated results are shown below.

With respect to a thermistor bolometer-type infrared detector having a pixel pitch of 25 $\mu$m, the parameters in Table 2 shown below were applied to the above equations to calculate the relationship between the temperature resolution (NETD) and the beam length index.

TABLE 2

| | |
|---|---|
| Absolute value of temperature coefficient of resistance of vanadium oxide: TCR (%/K) | 2 |
| Bolometer resistance: $R_B$ ($\Omega$) | 20,000 |
| Infrared radiation absorption ratio: $\eta$ (%) | 80 |
| 1/f noise K value | 7.0 × 10$^{-13}$ |
| Bias voltage: $V_B$ (V) | 3 |
| Optical system F value | 1 |
| Solid angle: $\Omega$ (sr) | 0.63 |
| $\int T_r (\lambda)$ (dB/dTo)d$\lambda$: (W/cm$^2$ · sr · K) | 8.8 × 10$^{-5}$ |
| Readout time: $\tau_{ro}$ (sec) | 3 × 10$^{-5}$ |
| Frame rate (Hz) | 30 |
| Band (low-frequency cutoff turned on): $f_1$ (Hz) | 15 |
| Operating temperature: $T_{OP}$ (K) | 300 |
| Background temperature: $T_{BKG}$ (K) | 300 |
| Electrode size: e ($\mu$m) | 7.5 |
| Beam width: d ($\mu$m) g-line stepper or i-line stepper | 2.6 or 2.0 |
| Slit width: g ($\mu$m) Ditto | 0.8 or 0.5 |
| Electrode width of beam: w ($\mu$m) | 1 |

TABLE 2-continued

| | |
|---|---|
| Electrode thickness of beam: t (Å) | 1000 |
| Protective film thickness of beam: (Å) | 5000 |
| VO$_X$ thickness: (Å) | 1000 |
| Circuit noise: V$_a$ ($\mu$V) (assumed to be 1.67 times the Johnson noise of the bolometer resistance) | 3.9 |

The electrode size e in Table 2 is determined by the pixel size. Table 3 below shows typical electrode sizes at various pixel pitches.

TABLE 3

| Pixel pitch p ($\mu$m) | Electrode size e ($\mu$m) |
|---|---|
| 15 | 5.5 |
| 20–25 | 6.5 |
| 30–40 | 7.5 |
| 50–70 | 10 |
| 80–100 | 15 |

For the calculation of the temperature resolution, the protective films of the diaphragm 2 and the beams 3 were in the form of silicon nitride films deposited by plasma CVD, the bolometer material of the diaphragm 2 was in the form of a thin film of vanadium oxide, and the interconnection material of the beams 3 was Ti. Table 4 below shows properties of typical materials for use as the diaphragm 2 and the beams 3.

TABLE 4

| Material | Thermal conductivity (W/(cm · K)) | Specific resistance ($\mu\Omega$cm) | Isovolumic specific heat (J/(cm$^3$ · K)) |
|---|---|---|---|
| Protective film SiN | 0.008 | | 2.0 |
| Interconnection material of Beams | | | |
| TiAl6V4 | 0.065 | 174 | 2.38 |
| VT-3 | 0.072 | | |
| 6Al-4 V | 0.0751 | | |
| 4Al-3Mo-1 V | 0.0833 | | |
| Ti-V-X | 0.087 | | |
| Ni-Cr alloy | 0.10–0.15 | | |
| Ti150A | 0.165 | | |
| Ti-Zr-X | 0.19 | | |
| Ti | 0.22 | 47 | 2.38 |
| Bolometer material VO$_X$ | 0.05 | | 3 |

For the calculation of the temperature resolution and the filling factor F$_F$, the beam width d and the slit width g were calculated as using the i-line stepper.

Figure 8:
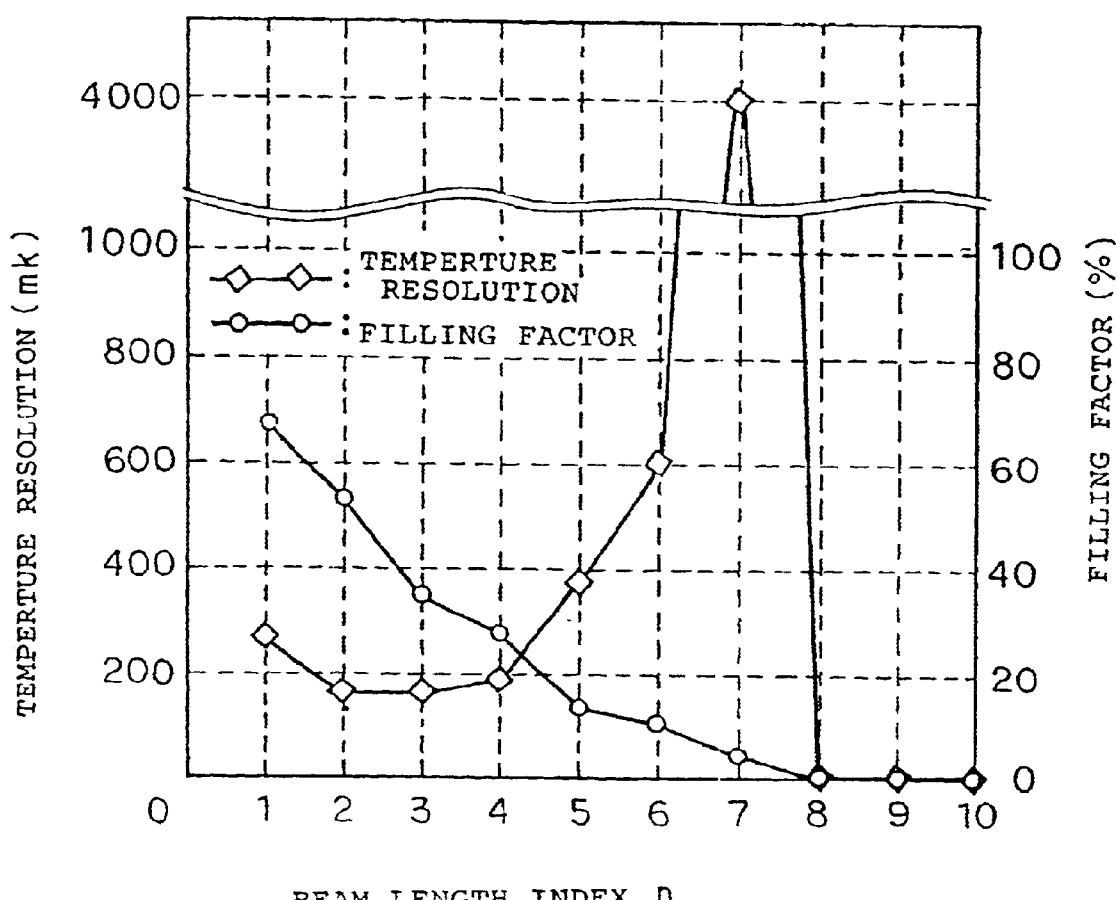
FIG. 8 is a graph showing the relationship between the temperature resolution and the beam length index and the relationship between the filling factor and the beam length index of a thermal infrared detector having a diaphragm supported by two beams, with pixels spaced at a pitch of 25 $\mu$m.

FIG. 8 shows the relationship between the temperature resolution and the beam length index n and the relationship between the filling factor F$_F$ and the beam length index.

As can be seen from FIG. 8, the filling factor F$_F$ decreases monotonously as the beam length index n increases. It can be understood from FIG. 8 that the beam length index n has an optimum value for minimizing the temperature resolution NETD.

The parameters shown in Table 2 and Table 3 were applied to the above equations to calculate the relationship between the beam length index n which minimizes the temperature resolution and the pixel pitch p, with respect to a pixel pitch p ranging from 15 to 50 $\mu$m.

In calculating the above relationship, it was found that the beam length index n which minimizes the temperature resolution has different tendencies for the beam width d and the slit width g obtained when the g-line stepper or the i-line stepper are used. The thermal conductivities k of the interconnection materials of the beams are classified into a first group (alloys mainly composed of Ti and containing at least Al) where k=0.065–0.09 (W/(cm.K)), a second group (Ni—Cr alloys) where k=0.10–0.15 (W/(cm.K)), and a third group (Ti or alloys mainly composed of Ti and containing no Al) where k=0.16–0.22 (W/(cm.K)). It was found that the beam length index n which minimizes the temperature resolution has different tendencies for these groups.

The thermal conductivities k were divided into the above three groups for each of the use of the g-line stepper and the use of the i-line stepper, and the relationship between the beam length index n which minimizes the temperature resolution and the pixel pitch p was calculated at increments of 5 $\mu$m of the pixel pitch p in the range from 15 to 50 $\mu$m. The relationship was also calculated when the thermal time constant $\tau_{th}$ is limited to a time equal to or smaller than the frame rate of a television signal, i.e., $\tau_{th} \leq 15$ msec. in order to make an after image unrecognizable when an infrared image is captured as a television image and also when the thermal time constant $\tau_{th}$ is not limited without any concern over an after image.

Figure 9A:
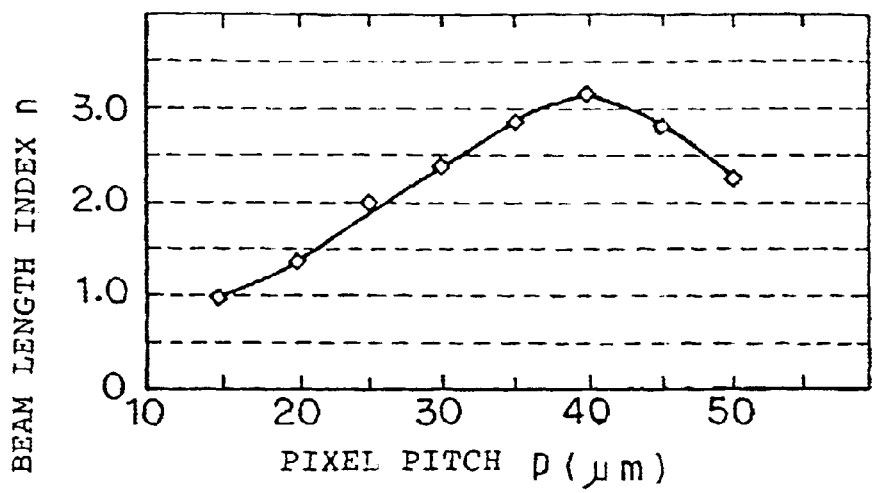
FIGS. 9a through 9c are graphs showing the relationship between beam length indices and pixel pitches which give a minimum temperature resolution due to different thermal conductivities of beam interconnection materials in the case where a thermal time constant $\tau_{th}$ is not limited, on the assumption that the thermal isolation structure of a thermal infrared detector is patterned using an i-line stepper.
Figure 9B:
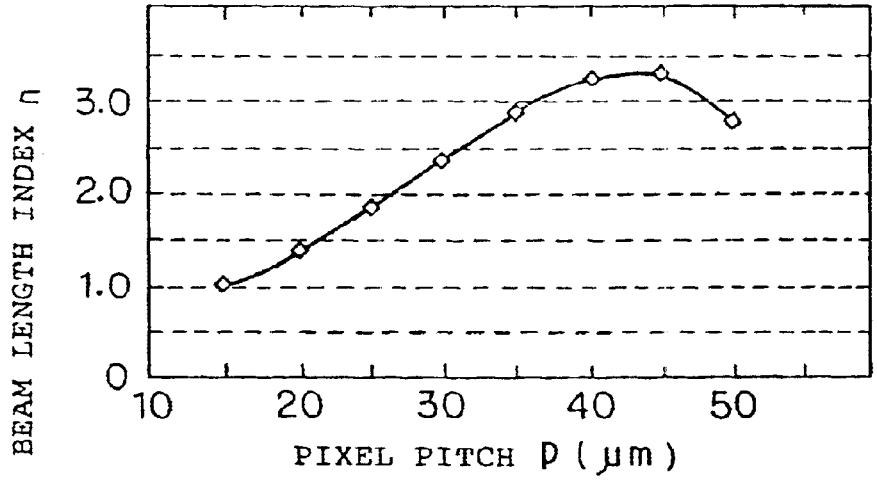
Figure 9C:
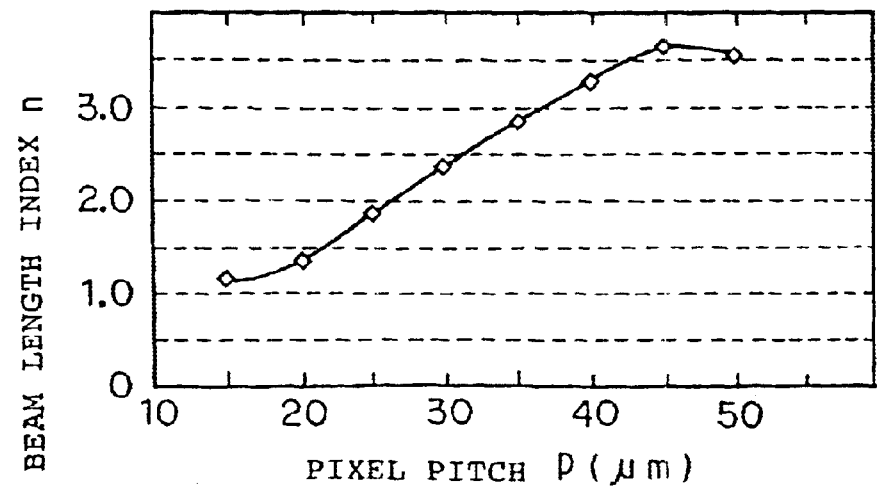
Figure 10A:
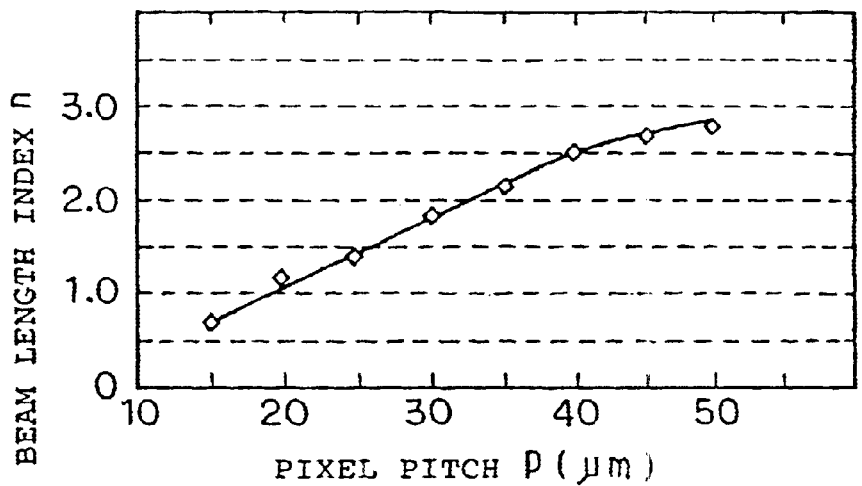
FIGS. 10a through 10c are graphs showing the relationship between beam length indices and pixel pitches which give a minimum temperature resolution due to different thermal conductivities of beam interconnection materials in the case where a thermal time constant $\tau_{th}$ is not limited, on the assumption that the thermal isolation structure of a thermal infrared detector is patterned using a g-line stepper.
Figure 10B:
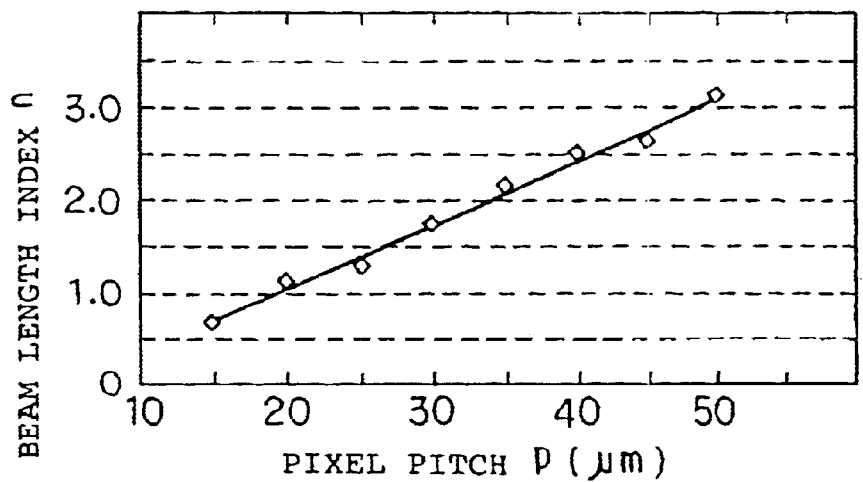
Figure 10C:
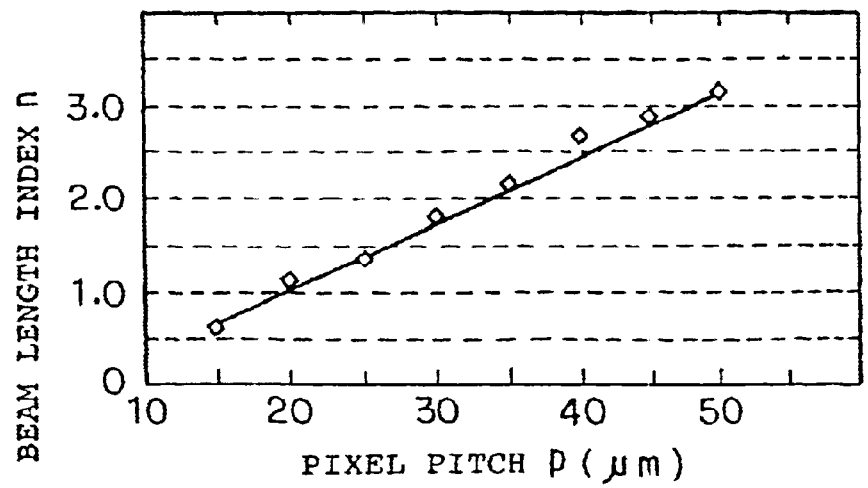
Figure 11A:
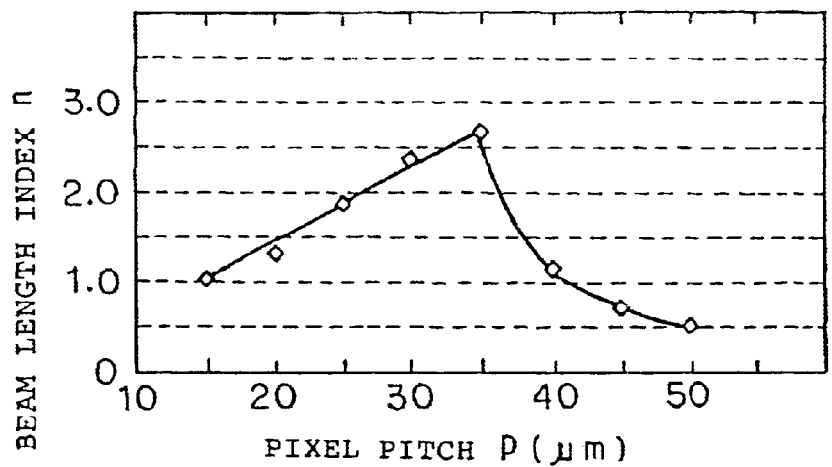
FIGS. 11a through 11c are graphs showing the relationship between beam length indices and pixel pitches which give a minimum temperature resolution due to different thermal conductivities of beam interconnection materials in the case where a thermal time constant $\tau_{th}$ is limited to a range $\tau_{th} \leq 15$ msec., on the assumption that the thermal isolation structure of a thermal infrared detector is patterned using an i-line stepper.
Figure 11B:
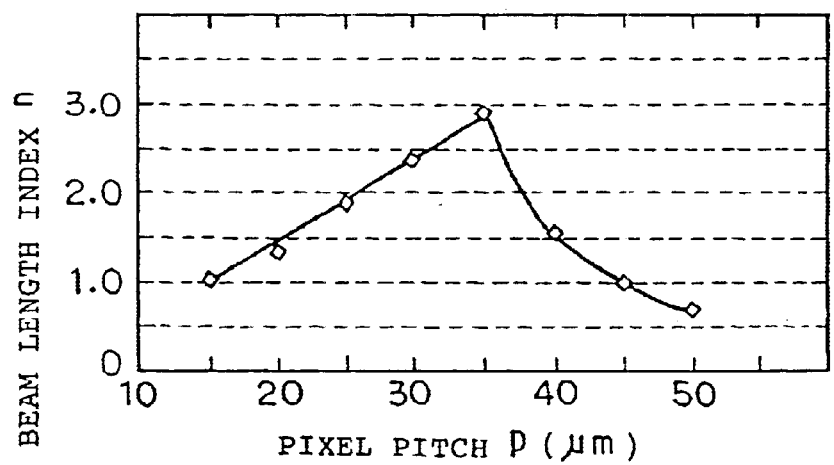
Figure 11C:
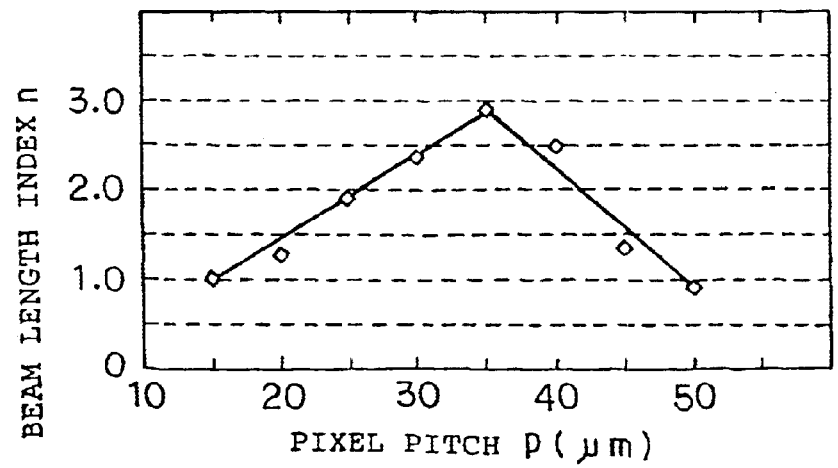
Figure 12A:
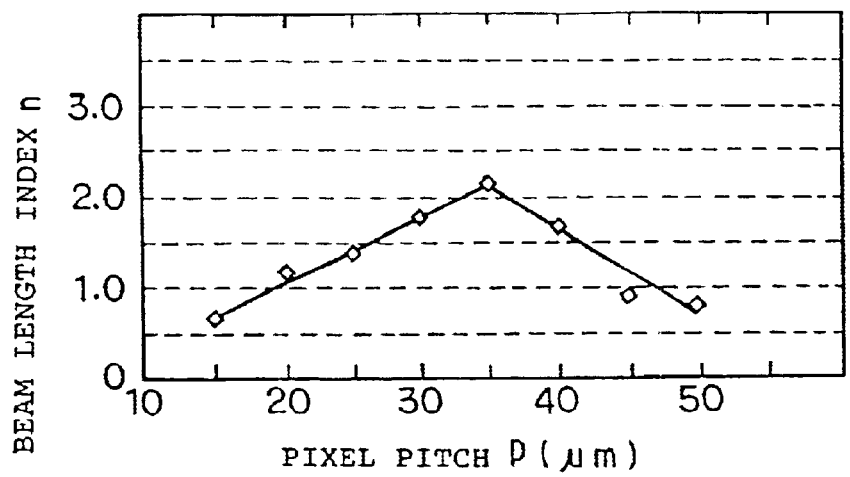
FIGS. 12a through 12c are graphs showing the relationship between beam length indices and pixel pitches which give a minimum temperature resolution due to different thermal conductivities of beam interconnection materials in the case where a thermal time constant $\tau_{th}$ is limited to a range $\tau_{th} \leq 15$ msec., on the assumption that the thermal isolation structure of a thermal infrared detector is patterned using a g-line stepper.
Figure 12B:
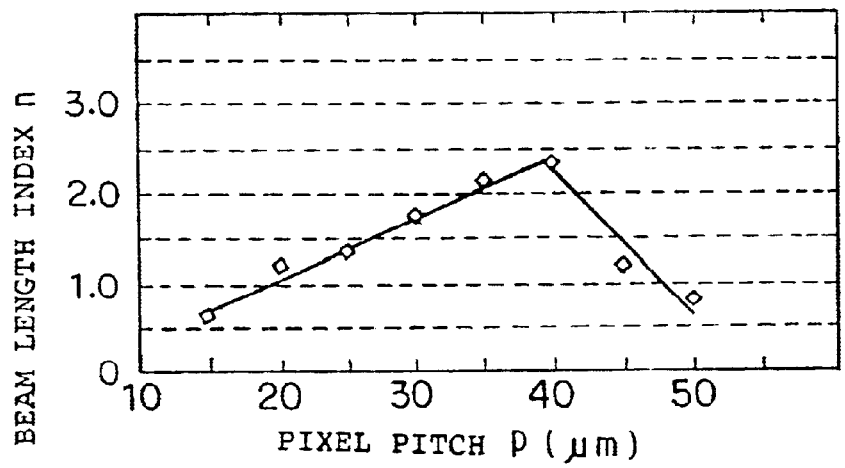
Figure 12C:
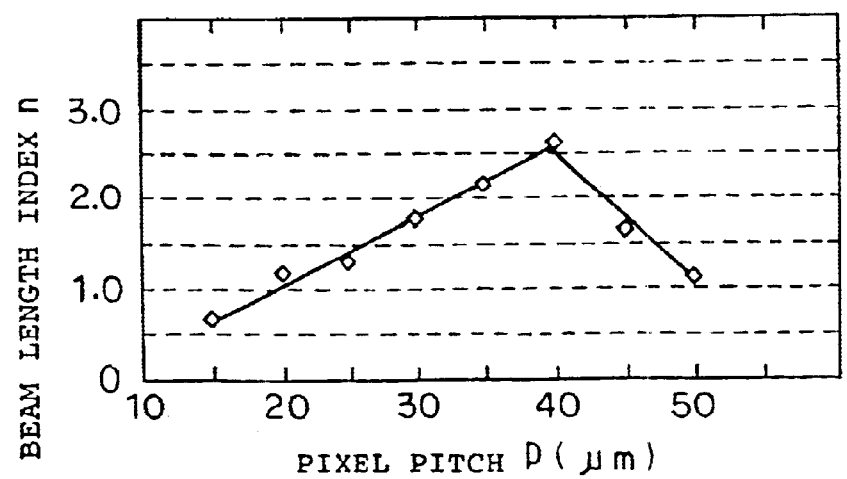

The calculated results as approximated by curved or straight lines are shown in FIGS. 9a through 9c, FIGS. 10a through 10c, FIGS. 11a through 11c, and FIGS. 12a through 12c. FIGS. 9a through 9c show the relationship between the beam length index and the pixel pitch when the i-line stepper was used and the thermal time constant $\tau_{th}$ was not limited. FIGS. 10a through 10c show the relationship between the beam length index and the pixel pitch when the g-line stepper was used and the thermal time constant $\tau_{th}$ was not limited. FIGS. 11a through 11c show the relationship between the beam length index and the pixel pitch when the i-line stepper was used and the thermal time constant $\tau_{th}$ limited to $\tau_{th} \leq 15$ msec. FIGS. 12a through 12c show the relationship between the beam length index and the pixel pitch when the g-line stepper was used and the thermal time constant $\tau_{th}$ limited to $\tau_{th} \leq 15$ msec. FIGS. 9a, 10a, 11a, 12a show the relationship with respect to the interconnection materials of the beams which belong to the first group, FIGS. 9b, 10b, 11b, 12b show the relationship with respect to the interconnection materials of the beams which belong to the second group, and FIGS. 9c, 10c, 11c, 12c show the relationship with respect to the interconnection materials of the beams which belong to the third group.

If the thermal time constant $\tau_{th}$ is not limited, then, as shown in FIGS. 9a through 9c, approximate expressions representing the relationship between the beam length index n which minimizes the temperature resolution and the pixel pitch p are given by the following equations:

(1) If $k=0.065$–$0.09$ (W/(cm.K)), $n=-1.8\times10^{-4}p^3+1.4\times10^{-2}p^2-0.27p+2.5$ (21)

(2) If $k=0.10$–$0.15$ (W/(cm.K)), $n=-1.5\times10^{-4}p^3+1.3\times10^{-2}p^2-0.24p+2.3$ (22)

(3) If $k=0.16$–$0.22$ (W/(cm.K)), $n=-1.1\times10^{-4}p^3+9.6\times10^{-3}p^2-0.17p+1.8$ (23)

Since the curves shown in FIGS. 10b, 10c increase linearly substantially equally to each other, they can be expressed by identical approximate expressions as follows:

(1) If $k=0.065–0.09$ (W/(cm.K)), $n=-2.81\times10^{-5}p^3+1.95\times10^{-3}p^2+2.97\times10^{-2}p-0.11$ \hfill (24)

(2) If $k=0.10–0.22$ (W/(cm.K)), $n=0.070p-0.35$ \hfill (25)

If the thermal time constant $\tau_{th}$ limited to $\tau_{th}\leq15$ msec., then as can be seen from FIGS. 11a through 11c and FIGS. 12a through 12c, the tendency of the beam length index n which minimizes the temperature resolution changed greatly across the pixel pitch p of 35 μm or 40 μm.

When the thermal isolation structure is patterned using the i-line stepper, insofar as the pixel pitch p is in the range of $15\leq p\leq35$ μm, as shown in FIGS. 11a through 11c, the beam length index n increases substantially linearly irrespectively of the thermal conductivity k of the interconnection material of the beams. Specifically, if the thermal conductivity k is in the range from 0.065 to 0.09 (W/(cm.K)), then the beam length index n is given as:

$$n=0.083p-0.21 \quad (26)$$

as shown in FIG. 11a, and if the thermal conductivity k is in the range from 0.10 to 0.22 (W/(cm.K)), then the beam length index n is given as:

$$n=0.096p-0.47 \quad (27)$$

as shown in FIGS. 11a and 11b.

Insofar as the pixel pitch p is in the range of $35<p\leq50$ μm, if the thermal conductivity k is in the range from 0.065 to 0.09 (W/(cm.K)), then the beam length index n is given as:

$$n=11/(p-30) \quad (28)$$

as shown in FIG. 11a, and if the thermal conductivity k is in the range from 0.10 to 0.15 (W/(cm.K)), then the beam length index n is given as:

$$n=16/(p-30) \quad (29)$$

as shown in FIG. 11b, and if the thermal conductivity k is in the range from 0.16 to 0.22 (W/(cm.K)), then the beam length index n decreases substantially linearly and is given as:

$$n=-0.14p+7.9 \quad (30)$$

as shown in FIG. 11c.

When the thermal isolation structure is patterned using the g-line stepper, if the thermal conductivity k is in the range from 0.065 to 0.09 (W/(cm.K)), as shown in FIG. 12a, then the beam length index n which minimizes the temperature resolution increases substantially linearly insofar as the pixel pitch p is in the range of $15\leq p\leq35$ μm, and decreases substantially linearly insofar as the pixel pitch p is in the range of $35<p\leq50$ μm. Specifically, insofar as the pixel pitch p is in the range of $15\leq p\leq35$ μm, the beam length index n is given as:

$$n=0.070p-0.35 \quad (31)$$

and insofar as the pixel pitch p is in the range of $35<p\leq50$ μm, the beam length index n is given as:

$$n=-0.099p+5.5 \quad (32)$$

If the thermal conductivity k is in the range from 0.10 to 0.15 (W/(cm.K)), then, as shown in FIG. 12b, the beam length index n which minimizes the temperature resolution increases substantially linearly insofar as the pixel pitch p is in the range of $15\leq p\leq40$ μm, and decreases substantially linearly insofar as the pixel pitch p is in the range of $40<p\leq50$ μm.

Specifically, insofar as the pixel pitch p is in the range of $15\leq p\leq40$ μm, the beam length index n is given as:

$$n=0.066p-0.28 \quad (33)$$

and insofar as the pixel pitch p is in the range of $40<p\leq50$ μm, the beam length index n is given as:

$$n=-0.15p+8.1 \quad (34)$$

If the thermal conductivity k is in the range from 0.16 to 0.22 (W/(cm.K)), then, as shown in FIG. 12c, the beam length index n which minimizes the temperature resolution increases substantially linearly insofar as the pixel pitch p is in the range of $15\leq p\leq40$ μm, and decreases substantially linearly insofar as the pixel pitch p is in the range of $40<p\leq50$ μm.

Specifically, insofar as the pixel pitch p is in the range of $15\leq p\leq40$ μm, the beam length index n is given as:

$$n=0.073p-0.42 \quad (35)$$

and insofar as the pixel pitch p is in the range of $40<p\leq50$ μm, the beam length index n is given as:

$$n=-0.14p+8.0 \quad (36)$$

Therefore, when the length of the beams is set according to the equations (21)–(36) depending on the interconnection material of the beams and the type of the light source of the exposure device that is used to pattern the thermal isolation structure, the thermal infrared detector has an optomal thermal isolation structure for the pixel pitch which minimizes the temperature resolution.

As can be seen from FIGS. 9a through 9c, FIGS. 10a through 10c, FIGS. 11a through 11c, and FIGS. 12a through 12c, insofar as the pixel pitch p ranges from 15 to 50 μm, the beam length index n which minimizes the temperature resolution is at most about 3. Therefore, the beams extend in one of the patterns shown in FIGS. 5 through 7.

In the above calculations, the patterning accuracy of the stepper, i.e., the slit width g between the diaphragm 2 and the beams 3 of the thermal infrared detector, is fixed to $g=0.5$ μm if the thermal isolation structure is patterned using the i-line stepper and to $g=0.8$ μm if the thermal isolation structure is patterned using the g-line stepper. Actually, however, the slit width g somewhat varies due to variations of the patterning accuracy no matter which stepper is used.

In view of variations of the slit width g due to the patterning accuracy of the stepper, the beam length index n which minimizes the temperature resolution at various pixel pitches p was calculated with respect to the slit width $g=0.3, 0.5, 0.7, 0.8, 1.0$ (μm) using the parameters shown in Table 2. The thermal conductivity k of the interconnection material of the beams 3 has a minimum value ($k=0.065$ (W/cm.K)) and a maximum value ($k=0.22$ (W/cm.K)) in the examples shown in Table 4. The slit widths of 0.3 μm and 0.5 μm are assumed to be achieved by the patterning performed by the i-line stepper, and the slit widths g ranging from 0.7 to 1.0 μm are assumed to be achieved by the patterning performed by the g-line stepper.

Table 5 below shows the calculated results.

TABLE 5

| Thermal conductivity k (W/cm·K) | Pixel pitch p (μm) | Slit width g (μm) | Beam length index n, $\tau_{th}$ not limited | Beam length index n, $\tau_{th} \leq 15$ (msec) | Variation percentage (%), $\tau_{th}$ not limited | Variation percentage (%), $\tau_{th} \leq 15$ (msec) |
|---|---|---|---|---|---|---|
| 0.065 | 20 | 0.5 | 1.2 | | +2 | |
|  |  | 0.3 | 1.22 | | | |
|  | 30 | 0.5 | 2.4 | | +11 | |
|  |  | 0.3 | 2.67 | | | |
|  | 45 | 0.5 | 2.67 | 0.67 | 0 | 0 |
|  |  | 0.3 | 2.67 | 0.67 | | |
|  | 30 | 1.0 | 1.6 | | +10 | |
|  |  | 0.8 | 1.77 | | | |
|  |  | 0.7 | 1.77 | | | |
|  | 45 | 1.0 | 2.44 | 0.87 | +4 | 0 |
|  |  | 0.8 | 2.53 | 0.87 | | |
|  |  | 0.7 | 2.53 | 0.87 | | |
| 0.22 | 30 | 0.5 | 2.43 | | +10 | |
|  |  | 0.3 | 2.67 | | | |
|  | 45 | 0.5 | 3.71 | 1.56 | +14 | −7.4 |
|  |  | 0.3 | 4.22 | 1.44 | | |
|  | 30 | 1.0 | 1.6 | | +10 | |
|  |  | 0.8 | 1.77 | | | |
|  |  | 0.7 | 1.77 | | | |
|  | 45 | 1.0 | 2.8 | 2.33 | +3 | −14 |
|  |  | 0.8 | 2.82 | 2.11 | | |
|  |  | 0.7 | 2.89 | 2.0 | | |

In Table 5, the variation percentage represents a variation percentage (assuming the i-line stepper) of the beam length index n at g=0.5 μm with respect to the beam length index n at g=0.3 μm and a variation percentage (assuming the g-line stepper) of the beam length index n at g=0.7 μm with respect to the beam length index n at g=1.0 μm when the thermal conductivity k of the interconnection material and the pixel pitch p remain the same.

A review of Table 5 indicates that when either the i-line stepper or the g-line stepper is used, the beam length index n which minimizes the temperature resolution varies in the range from −15% to +15% depending on variations of the slit width g. Therefore, in view of variations of the slit width g, the length of the beams may be set in the range from 0.85 n to 1.15 n in the above equations (21) through (36). In this manner, the length of the beams 3 can be set with increased freedom depending on the layouts of the beams 3 and the contacts 5 in each of the pixels of the thermal infrared detectors shown in FIGS. 5 through 7, while the temperature resolution is held to a small value.

In the above calculations of the temperature resolution, the thermal conductance and filling factor of the thermal isolation structure are applicable to not only thermistor bolometer-type infrared detectors, but thermopile and pyroelectric infrared detectors having a thermal isolation structure.

While preferred embodiments of the present invention have been described using specific terms, such description is for illustrative purposes only, and it is to be understood that changes and variations may be made without departing from the spirit or scope of the following claims.

What is claimed is:

1. A thermal infrared detector comprising:

a substrate having a readout circuit; and a plurality of pixels patterned on said substrate at a pitch p in the range of $15 \leq p \leq 50$ (μm) by a g-line stepper;

each of said pixels having a photo-sensitive area including a thin film of bolometer and spaced from said substrate, two beams by which said photo-sensitive area is supported on said substrate, and interconnections formed respectively on said beams and connecting said readout circuit and said thin film of bolometer to each other;

wherein each beam has a length determined by a beam length index n calculated by dividing the length of each of said beams by one-quarter of the peripheral length of said pixel;

wherein a reference value $n_0$ for the beam length index n is given by equations:

$$n_0 32 -2.81 \times 10^{-5} p^3 + 1.95 \times 10^{-3} p^2 + 2.97 \times 10^{-2} p - 0.11$$

when said interconnections are made of a material having a thermal conductivity k in the range of $0.065 \leq k \leq 0.09$ (W/(cm.K)); and $$n_0 = 0.070\ p - 0.35$$

when said interconnections are made of a material having a thermal conductivity k in the range of $0.10 \leq k \leq 0.22$ (W/(cm.K));

wherein said beam length index n is in the range of $0.85\ n_0 \leq n \leq 1.15\ n_0$.

2. A thermal infrared detector according to claim 1, wherein said material of said interconnections comprises an alloy mainly composed of Ti and containing at least Al, an Ni—Cr alloy, Ti, or an alloy mainly composed of Ti and containing no Al.

3. A thermal infrared detector according to claim 1, wherein each of said beams extends along an outer peripheral edge of said photo-sensitive area and is spaced from said photo-sensitive area by a gap g in the range of $0.7 \leq g \leq 1.0$ (μm).

4. A thermal infrared detector comprising:

a substrate having a readout circuit; and a plurality of pixels patterned on said substrate at a pitch p in the range of $15 \leq p \leq 50$ (μm) by a g-line stepper;

each of said pixels having a photo-sensitive area including a thin film of bolometer and spaced from said substrate, two beams by which said photo-sensitive area is supported on said substrate, and interconnections formed respectively on said beams and connecting said readout circuit and said thin film of bolometer to each other;

wherein said interconnections are made of a material having a thermal conductivity k in the range of 0.065 C $k \leq 0.09$ (W/(cm.K)) and a thermal time constant $\tau_{th} \leq 15$ (msec);

wherein each beam has a length determined by a beam length index n calculated by dividing the length of each of said beams by one-quarter of the peripheral length of said pixel;

wherein a reference value $n_0$ for the beam length index n is given by equations:

$$n_0 = 0.070\ p - 0.35$$

when said pitch p is in the range of $15 \leq p \leq 35$ (μm); and $$n_0 = -0.099\ p + 5.5$$

when said pitch p is in the range of $35 \leq p \leq 50$ (μm);

wherein said beam length index n is in the range of $0.85\ n_0 \leq n \leq 1.15\ n_0$.

5. A thermal infrared detector according to claim 4, wherein said material of said interconnections comprises an alloy mainly composed of Ti and containing at least Al.

6. A thermal infrared detector according to claim 4, wherein each of said beams extends along an outer peripheral edge of said photo-sensitive area and is spaced from said photo-sensitive area by a gap g in the range of $0.7 \leq g \leq 1.0$ ($\mu$m).

7. A thermal infrared detector comprising:

a substrate having a readout circuit; and a plurality of pixels patterned on said substrate at a pitch p in the range of $15 \leq p \leq 50$ ($\mu$m) by a g-line stepper;

each of said pixels having a photo-sensitive area including a thin film of bolometer and spaced from said substrate, two beams by which said photo-sensitive area is supported on said substrate, and interconnections formed respectively on said beams and connecting said readout circuit and said thin film of bolometer to each other;

wherein said interconnections are made of a material having a thermal conductivity k in the range of $0.10 \leq k \leq 0.15$ (W/(cm.K)) and a thermal time constant $\tau_{th} \leq 15$ (msec);

wherein each beam has a length determined by a beam length index n calculated by dividing the length of each of said beams by one-quarter of the peripheral length of said pixel;

wherein a reference value $n_0$ for the beam length index n is given by equations:

$$n_0 = 0.066\, p - 0.28$$

when said pitch p is in the range of $15 \leq p \leq 40$ ($\mu$m); and $$n_0 = -0.15\, p + 8.1$$

when said pitch p is in the range of $40 \leq p \leq 50$ ($\mu$m);

wherein said beam length index n is in the range of $0.85\, n_0 \leq n \leq 1.15\, n_0$.

8. A thermal infrared detector according to claim 7, wherein said material of said interconnections comprises an Ni—Cr alloy.

9. A thermal infrared detector according to claim 7, wherein each of said beams extends along an outer peripheral edge of said photo-sensitive area and is spaced from said photo-sensitive area by a gap g in the range of $0.7 \leq g \leq 1.0$ ($\mu$m).

10. A thermal infrared detector comprising:

a substrate having a readout circuit; and a plurality of pixels patterned on said substrate at a pitch p in the range of $15 \leq p \leq 50$ ($\mu$m) by a g-line stepper;

each of said pixels having a photo-sensitive area including a thin film of bolometer and spaced from said substrate, two beams by which said photo-sensitive area is supported on said substrate, and interconnections formed respectively on said beams and connecting said readout circuit and said thin film of bolometer to each other;

wherein said interconnections are made of a material having a thermal conductivity k in the range of $0.16 \leq k \leq 0.22$ (W/(cm.K)) and a thermal time constant $\tau_{th} \leq 15$ (msec);

wherein each beam has a length determined by a beam length index n calculated by dividing the length of each of said beams by one-quarter of the peripheral length of said pixel;

wherein a reference value $n_0$ for the beam length index n is given by equations:

$$n_0 = 0.073\, p - 0.42$$

when said pitch p is in the range of $15 \leq p \leq 40$ ($\mu$m); and $$n_0 = -0.14\, p + 8.0$$

when said pitch p is in the range of $40 \leq p \leq 50$ ($\mu$m);

wherein said beam length index n is in the range of $0.85\, n_0 \leq n \leq 1.15\, n_0$.

11. A thermal infrared detector according to claim 10, wherein said material of said interconnections comprises Ti or an alloy mainly composed of Ti and containing no Al.

12. A thermal infrared detector according to claim 10, wherein each of said beams extends along an outer peripheral edge of said photo-sensitive area and is spaced from said photo-sensitive area by a gap g in the range of $0.7 \leq g \leq 1.0$ ($\mu$m).

* * * * *